United States Patent
Han (10) Patent No.: US 7,590,193 B2
(45) Date of Patent: Sep. 15, 2009

(54) FREQUENCY RECOVERY APPARATUS AND MOBILE BROADCAST RECEIVER USING THE FREQUENCY RECOVERY APPARATUS

(75) Inventor: Jung Il Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 11/205,965

(22) Filed: Aug. 17, 2005

(65) Prior Publication Data
US 2006/0039491 A1 Feb. 23, 2006

(30) Foreign Application Priority Data
Aug. 18, 2004 (KR) .................. 10-2004-0065076

(51) Int. Cl.
*H04L 27/00* (2006.01)
(52) U.S. Cl. ................. 375/326; 375/316; 375/324; 375/325
(58) Field of Classification Search ........... 375/260, 375/295, 316, 324–326
See application file for complete search history.

(56) References Cited

U.S. PATENT DOCUMENTS

| | | | | |
|---|---|---|---|---|
| 6,137,847 | A * | 10/2000 | Stott et al. ............. | 375/344 |
| 6,993,093 | B2 * | 1/2006 | Ohtaki et al. ........... | 375/316 |
| 7,068,593 | B2 * | 6/2006 | Cho et al. ............. | 370/208 |
| 7,203,245 | B1 * | 4/2007 | Murphy ................ | 375/260 |
| 7,206,279 | B2 * | 4/2007 | Taga et al. ............. | 370/208 |
| 7,221,721 | B2 * | 5/2007 | Kim et al. ............. | 375/344 |
| 7,266,162 | B2 * | 9/2007 | Jiang .................. | 375/326 |
| 7,292,527 | B2 * | 11/2007 | Zhou et al. ............ | 370/203 |
| 2001/0055271 | A1 * | 12/2001 | Okada et al. .......... | 370/206 |
| 2002/0145971 | A1 * | 10/2002 | Cho et al. ............. | 370/208 |
| 2003/0002595 | A1 * | 1/2003 | Kim et al. ............. | 375/316 |
| 2003/0021350 | A1 * | 1/2003 | Kitada et al. .......... | 375/260 |
| 2003/0112825 | A1 * | 6/2003 | Wang et al. ............ | 370/491 |
| 2003/0185147 | A1 * | 10/2003 | Taga et al. ............. | 370/210 |
| 2003/0231718 | A1 * | 12/2003 | Jiang .................. | 375/326 |
| 2004/0008618 | A1 * | 1/2004 | Shirakata et al. ....... | 370/208 |

(Continued)

FOREIGN PATENT DOCUMENTS

EP 1434 403 A1 6/2004

OTHER PUBLICATIONS

Sandell M et al: "Timing and Frequency Synchronization in OFDM System Using the Cyclic Prefix" International Symposium on Synchronization, Dec. 1995, pp. 16-19, XP000879322 *p. 17, right-hand column-p. 18, left-hand column*.

*Primary Examiner*—Jason M. Perilla
(74) *Attorney, Agent, or Firm*—Lee, Hong, Degerman, Kang & Waimey (57) ABSTRACT

A frequency recovery apparatus and a mobile broadcast reception system utilizing the frequency recovery apparatus are disclosed. The frequency recovery apparatus and the mobile broadcast receiver estimate a fractional frequency offset value using I and Q components of a correlation value of a guard interval and compensate for the estimated fractional frequency offset value, resulting in the implementation of correct and rapid acquisition characteristics. The feedback-structured fractional carrier recovery apparatus estimates a fractional frequency offset, and compensates for the estimated fractional frequency offset, such that it solves the problem of ambiguity which may occur in a specific position corresponding to 0.5 times a sub-carrier spacing, and the fractional frequency offset can be stably estimated or compensated for.

31 Claims, 6 Drawing Sheets

U.S. PATENT DOCUMENTS

| | | | |
|---|---|---|---|
| 2004/0071234 A1* | 4/2004 | Li | 375/341 |
| 2004/0114551 A1* | 6/2004 | Gavillero Martin et al. | 370/324 |
| 2004/0160987 A1* | 8/2004 | Sudo et al. | 370/480 |
| 2004/0180635 A1* | 9/2004 | Choi et al. | 455/113 |
| 2005/0084023 A1* | 4/2005 | Bott et al. | 375/260 |
| 2006/0039491 A1* | 2/2006 | Han | 375/260 |
| 2006/0230089 A1* | 10/2006 | Scott et al. | 708/270 |
| 2007/0133497 A1* | 6/2007 | Vare et al. | 370/345 |

\* cited by examiner

FREQUENCY RECOVERY APPARATUS AND MOBILE BROADCAST RECEIVER USING THE FREQUENCY RECOVERY APPARATUS

CROSS REFERENCE TO RELATED APPLICATIONS

Pursuant to 35 U.S.C. § 119(a), this application claims the benefit of earlier filing date and right of priority to Korean Patent Application No. 10-2004-0065076, filed on Aug. 18, 2004, the content of which is hereby incorporated by reference herein in its entirety.

BACKGROUND OF THE INVENTION

1. Field of the Invention

The present invention relates to a frequency recovery apparatus and a mobile broadcast receiver using the frequency recovery apparatus.

2. Discussion of the Related Art

Generally, an Orthogonal Frequency Division Multiplexing (OFDM) transmission scheme has been considered a specific format of multi-carrier transmission scheme in which a single data column is transmitted via a sub-carrier having a lower data transfer rate. If the OFDM scheme is employed for signal transmission, a transmission signal has very strong resistance to a frequency selective fading phenomenon or a narrowband interference phenomenon. Although a single carrier system may encounter a failure of overall links due to a single fade or interference phenomenon, only some carriers will be affected in a multi-carrier system. Therefore, a small number of erroneous sub-carriers may be corrected by a forward error correction scheme.

European-Digital Video Broadcasting (EP-DVB) has been established in Europe whereby many developers have conducted intensive research into a satellite broadcast scheme, a cable broadcast scheme, and a terrestrial digital broadcast scheme. Specifically, a Digital Video Broadcasting-Terrestrial (DVB-T) standard corresponding to the terrestrial digital broadcast scheme has selected the OFDM scheme as a transmission scheme.

A DVB-T transmission system performs mapping of data to be transmitted according to a modulation method when transmitting desired data using the OFDM scheme, controls the mapping result to pass through an Inverse Fast Fourier Transform (IFFT), inserts a guard interval into the IFFT result, and transmits the resultant data having the guard interval via a frequency domain. In other words, a single OFDM symbol is divided into a guard interval and a useful data interval. The guard interval data is equal to the duplication of data contained in the last part of the useful data interval. In this case, the guard interval insertion in individual OFDM symbols is adapted to prevent system performance deterioration caused by an Inter Symbol Interference (ISI) and a ghost.

Therefore, the DVB-T reception system performs a Fast Fourier Transform (FFT) of a received signal, such that it can perform signal demodulation in a general transmission scheme.

A frequency recovery function from among a plurality of synchronization components is adapted to allow a Radio Frequency (RF) carrier frequency of a transmitter to coincide with that of a receiver. A difference between the RF carrier frequencies of the transmitter and the receiver is called a frequency offset. The frequency offset occurs according to two serious influences associated with a reception signal.

First, the magnitude of a signal transmitted via individual sub-carriers is demodulated by the FFT, resulting in reduction of the signal magnitude. Second, Inter-Carrier Interference (ICI) occurs, such that orthogonality between sub-carriers cannot be maintained.

The OFDM scheme has a relatively very narrow frequency interval between sub-carriers when compared to a transmission band, such that it may cause a transmission signal to be greatly affected by a small frequency offset less than the sub-carrier interval. Therefore, a frequency recovery technology for use in the OFDM scheme is considered an important technology.

Generally, the OFDM scheme controls frequency recovery in two modes as opposed to a single carrier transmission scheme. The two modes are a fractional carrier recovery mode and an integral carrier recovery mode.

The integral carrier recovery mode estimates an integer multiple of a sub-carrier interval closest to an initial frequency offset and compensates for the estimated result. The fractional carrier recovery mode estimates a frequency offset less than half of a sub-carrier interval and compensates for the estimated result.

The fractional carrier recovery serves as a function for tracking a frequency offset having a predetermined size less than a half of a sub-carrier interval. Generally, it is well known in the art that a sub-carrier interval of 0.001 or less must be employed to neglect the influence of a frequency offset in a reception signal.

In this case, the fractional carrier recovery can be implemented in time and frequency domains. In more detail, the fractional carrier recovery can be implemented using a guard interval in the time domain located before an FFT unit and can also be implemented in the frequency domain located after the FFT unit using phase variation generated in a complex value received via a Continual Pilot (CP).

Figure 1:
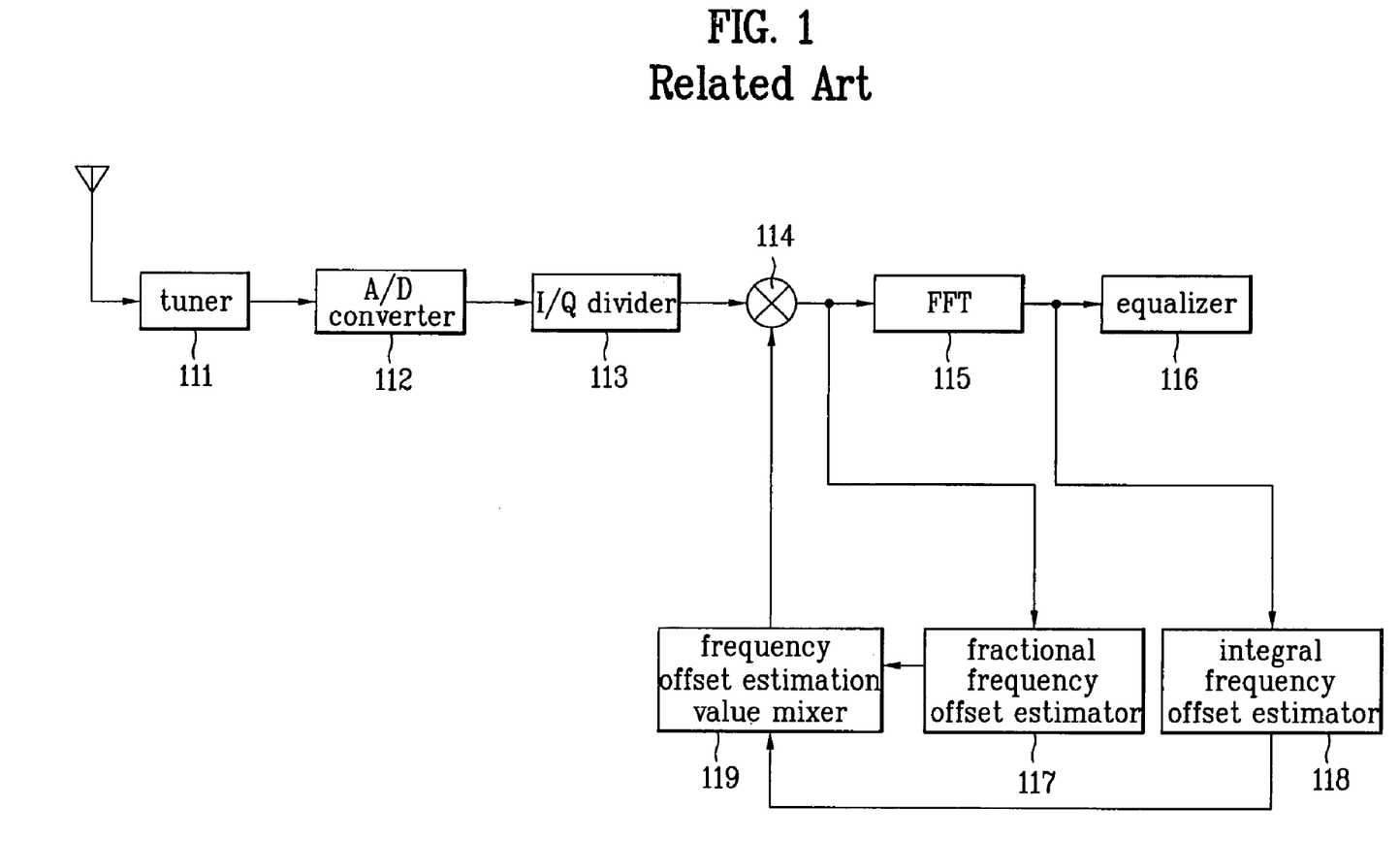
FIG. 1 is a block diagram illustrating a conventional DVB-T receiver system.

FIG. 1 is a block diagram illustrating a DVB-T reception system including a general frequency recovery device. An apparatus for compensating for the fractional carrier recovery in the time domain is shown in FIG. 1.

Referring to FIG. 1, a tuner 111 tunes an RF signal based on an OFDM scheme using an antenna, converts the RF signal into an Intermediate Frequency (IF) signal, and outputs the IF signal to an Analog-to-Digital (A/D) converter 112, resulting in a digitized IF signal. A signal digitized in the A/D converter 112 has only an In phase (I) component, and is applied to an I/Q divider 113, such that it is converted into a complex-component signal having a Quadrature (Q) component as well as the I component.

The digital complex signal is applied to a frequency-offset compensator 114. The frequency-offset compensator 114 multiplies the digital complex signal by the estimated frequency offset, such that it generates a baseband complex signal in which the frequency offset is corrected. It is assumed that the fractional carrier recovery has been performed in the time domain, such that the output signal of the frequency offset compensator 114 is transmitted to an FFT unit 115, and at the same time is transmitted to a fractional frequency offset estimator 117.

The FFT unit 115 removes guard interval data from the baseband complex signal generated from the frequency offset compensator 114, performs the FFT process on only useful interval data, and transmits a frequency-domain value to an equalizer 116 and an integral frequency offset estimator 118. The equalizer 116 receives a carrier distorted by a channel from the FFT-processed signal, and compensates for the received carrier.

The integral frequency offset estimator 118 estimates an integer part from among a rounded-off value of a relative frequency offset. The fractional frequency offset compensator 117 estimates a frequency offset of a decimal part serving as a difference in a rounded-off value and a relative frequency offset established prior to the rounding-off process. Specifically, the integral frequency offset estimator 118 reduces a frequency offset to ½ or less of the sub-carrier interval.

The fractional frequency offset estimator 117 fractionally adjusts the frequency offset to be zero. The frequency offset value of the decimal part estimated by the fractional frequency offset estimator 117 and the frequency offset value of the integer part estimated by the integral frequency offset estimator 118 are summed by a frequency offset estimation value mixer 119, such that an output signal of the frequency offset estimation value mixer 119 is transmitted to the frequency offset compensator 114. The frequency offset compensator 114 multiples the digitized complex signal by the estimated frequency offset value, such that it compensates for a frequency offset.

Mobile communication capable of allowing a user to view a TV via a receiver configured in the form of a mobile phone has been considered to be the most important TV-viewing method. The DVB has recently established a DVB-Handheld (DVB-H) scheme suitable for the above-mentioned mobile communication. Specifically, if the DVB-T scheme aims to implement a multi-channel or a high definition (HD, the DVB-H scheme aims to allow a user to satisfactorily view a Standard Definition (SD)—grade image of less than 2 Mbps or less while the user is in motion at high speed.

Two transmission methods have been widely used as the above-mentioned DVB-H transmission. In the first transmission method, a signal is multiplexed with an output signal of a DVB-T system and the multiplexed result is broadcast via the same transmitter. In the second transmission method, a signal is broadcast via a DVB-H dedicated transmitter in an independent channel.

However, the DVB-T scheme serving as the European terrestrial digital TV transmission scheme has been developed to receive TV signals suitable for a predetermined screen size of 12×40 inches. Therefore, if the system shown in FIG. 1 is applied to the DVB-H system, the DVB-H system is ineffective in power consumption because a mobile broadcast receiver is driven by a battery suitable for a screen size of 3×6 inches to receive TV signals.

Therefore, the OFDM scheme has many advantages over a single carrier system, but provides very weak resistance to a variety of synchronous errors such as a frequency offset. As a result, individual technologies required for designing the above-mentioned mobile broadcast receiver must be intensively studied by those skilled in the art.

SUMMARY OF THE INVENTION

Accordingly, the present invention is directed to a frequency recovery apparatus and a mobile broadcast receiver utilizing the frequency recovery apparatus that substantially obviates one or more problems due to limitations and disadvantages of the related art. An object of the present invention is to provide a frequency recovery apparatus for correctly estimating a fractional carrier frequency offset to optimize synchronous performance, and a mobile broadcast receiver utilizing the frequency recovery apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one aspect of the present invention, a frequency recovery apparatus for use in receiving an Orthogonal Frequency Division Multiplexing (OFDM) symbol consisting of a useful data interval and a guard interval is provided. The apparatus includes a guard interval detector adapted to detect guard interval information in complex digital sample data, the complex digital sample data obtained by demodulating the OFDM symbol, and a frequency offset estimator adapted to determine a start position of the OFDM symbol using the detected guard interval information, divide a Quadrature-component value of the start position by an In phase-component value of the start position, calculate an arc tangent value based on the divided result, and generate a fractional frequency offset compensation value.

Preferably, the apparatus further includes a frequency offset compensator adapted to multiply the complex digital sample by the fractional frequency offset compensation value from the frequency offset estimator and generate baseband complex sample data having a compensated fractional frequency offset.

Preferably, the guard interval detector includes a delay unit adapted to delay the complex digital sample data by a number of samples corresponding to a number of samples in the useful data interval of the OFDM symbol, a conjugation unit adapted to conjugate the delayed complex digital sample data, a multiplier unit adapted to multiply the complex digital sample data by the delayed conjugated complex digital sample data and an integrator unit adapted to accumulate an output value of the multiplier unit during a predetermined time corresponding to a number of guard interval samples in the OFDM symbol and output the accumulated result.

It is contemplated that the number of useful data intervals in the OFDM symbol varies according to a transmission mode. Preferably, the transmission mode is either a 2K mode or an 8K mode.

It is contemplated that the number of the guard interval samples in the OFDM symbol varies according to a transmission mode and the length of guard intervals of individual transmission modes. Preferably, the length of guard intervals of the individual transmission modes either ¼, ⅛, ¹⁄₁₆ or ¹⁄₃₂ of actual useful data.

Preferably, the frequency offset estimator includes a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a fractional frequency offset compensation value based on the arc tangent value, and a Numerical Controlled Oscillator adapted to generate the fractional frequency offset compensation value based on the estimated fractional frequency offset compensation value from the fractional frequency offset detector.

In another aspect of the present invention, a frequency recovery apparatus for use in receiving an Orthogonal Frequency Division Multiplexing (OFDM) symbol consisting of a useful data interval and a guard interval is provided. The apparatus includes a frequency offset compensator adapted to generate baseband complex digital sample data by multiplying complex digital sample data by a fractional frequency offset compensation value, the complex digital sample data obtained by demodulating the OFDM symbol, a guard interval detector adapted to detect guard interval information in the baseband complex digital sample data, and a frequency offset estimator adapted to determine a start position of the OFDM symbol using the detected guard interval information, divide a Quadrature-component value of the start position by an Component-component value of the start position, calculate an arc tangent value based on the divided result, generate the fractional frequency offset compensation value, and output the fractional frequency offset compensation value to the frequency offset compensator.

Preferably, the guard interval detector includes a delay unit adapted to delay the baseband complex digital sample data by a number of samples corresponding to a number of samples in the useful data interval of the OFDM symbol, a conjugation unit adapted to conjugate the delayed baseband complex digital sample data, a multiplier unit adapted to multiply the baseband complex digital sample data by the delayed baseband complex digital sample data, and an integrator unit adapted to accumulate an output value of the multiplier unit during a predetermined time corresponding to a number of guard interval samples in the OFDM symbol and output the accumulated result.

It is contemplated that the number of useful data intervals in the OFDM symbol varies according to a transmission mode. Preferably, the transmission mode is either a 2K mode or an 8K mode.

It is contemplated that the number of the guard interval samples in the OFDM symbol varies according to a transmission mode and the length of guard intervals of individual transmission modes. Preferably, the length of guard intervals of the individual transmission modes either ¼, ⅛, 1/16 or 1/32 of actual useful data.

Preferably, the frequency offset estimator includes a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a fractional frequency offset compensation value of a current OFDM symbol based on the arc tangent value, an adder adapted to add an estimated fractional frequency offset compensation value of a previous OFDM symbol to the estimated fractional frequency offset compensation value of the current OFDM symbol from the fractional frequency offset detector, a delay unit adapted to delay the estimated fractional frequency offset compensation value from the adder during a single OFDM symbol interval, and a Numerical Controlled Oscillator adapted to generate the fractional frequency offset compensation value based on the estimated fractional frequency offset compensation value from the delay unit and output the fractional frequency offset compensation value to the frequency offset compensator.

Preferably, the adder is further adapted to perform the addition at only a specific position of a last portion of the current OFDM symbol and to use a fractional frequency offset compensation value estimated according to the previous OFDM symbol at the remaining positions other than the specific position.

In another aspect of the present invention a mobile broadcast receiver is provided. The receiver includes a tuner adapted to receive and tune an Orthogonal Frequency Division Multiplexing (OFDM) symbol comprising a useful data interval and a guard interval, a demodulator adapted to digitize the tuned OFDM symbol from the tuner and generate complex digital sample data, a guard interval detector adapted to detect guard interval information in the complex digital sample data from the demodulator, a frequency offset estimator adapted to determine a start position of the OFDM symbol using the detected guard interval information, divide a Quadrature-component value of the start position by an Component-component value of the start position, calculate an arc tangent value based on the divided result, and generate a fractional frequency offset compensation value, a frequency offset compensator adapted to multiply the complex digital sample by the fractional frequency offset compensation value from the frequency offset estimator and generate baseband complex sample data having a compensated fractional frequency offset, and a Fast Fourier Transform (FFT) unit adapted to generate an FFT window and perform an FFT process on only baseband complex sample data contained in the FFT window from among the baseband complex sample data generated by the frequency offset compensator.

Preferably, the guard interval detector includes a delay unit adapted to delay the complex digital sample data by a number of samples corresponding to a number of samples in the useful data interval of the OFDM symbol, a conjugation unit adapted to conjugate the delayed complex digital sample data, a multiplier unit adapted to multiply the complex digital sample data by the delayed conjugated complex digital sample data, and an integrator unit adapted to accumulate an output value of the multiplier unit during a predetermined time corresponding to a number of guard interval samples in the OFDM symbol and output the accumulated result.

It is contemplated that the number of useful data intervals in the OFDM symbol varies according to a transmission mode. Preferably, the transmission mode is either a 2K mode or an 8K mode.

It is contemplated that the number of the guard interval samples in the OFDM symbol varies according to a transmission mode and the length of guard intervals of individual transmission modes. Preferably, the length of guard intervals of the individual transmission modes either ¼, ⅛, 1/16 or 1/32 of actual useful data.

Preferably, the frequency offset estimator includes a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a fractional frequency offset compensation value based on the arc tangent value, and a Numerical Controlled Oscillator adapted to generate the fractional frequency offset compensation value based on the estimated fractional frequency offset compensation value from the fractional frequency offset detector.

In another aspect of the present invention, a mobile broadcast receiver is provides. The receiver includes a tuner adapted to receive and tune an Orthogonal Frequency Division Multiplexing (OFDM) symbol comprising a useful data interval and a guard interval, a demodulator adapted to digitize the tuned OFDM symbol from the tuner and generate complex digital sample data, a frequency offset compensator adapted to generate baseband complex digital sample data by multiplying the complex digital sample data from the demodulator by a fractional frequency offset compensation value, a guard interval detector adapted to detect guard interval information in the baseband complex digital sample data, a frequency offset estimator adapted to determine a start position of the OFDM symbol using the detected guard interval information, divide a Quadrature-component value of the start position by an Component-component value of the start position, calculate an arc tangent value based on the divided result, generate the fractional frequency offset compensation value, and output the fractional frequency offset compensation value to the frequency offset compensator, and a Fast Fourier Transform (FFT) unit adapted to generate an FFT window and perform an FFT process on only baseband complex sample data contained in the FFT window from among the baseband complex sample data generated by the frequency offset compensator.

Preferably, the guard interval detector includes a delay unit adapted to delay the baseband complex digital sample data by a number of samples corresponding to a number of samples in the useful data interval of the OFDM symbol, a conjugation unit adapted to conjugate the delayed baseband complex digital sample data, a multiplier unit adapted to multiply the baseband complex digital sample data by the delayed baseband complex digital sample data, and an integrator unit adapted to accumulate an output value of the multiplier unit during a predetermined time corresponding to a number of guard interval samples in the OFDM symbol and output the accumulated result.

It is contemplated that the number of useful data intervals in the OFDM symbol varies according to a transmission mode. Preferably, the transmission mode is either a 2K mode or an 8K mode.

It is contemplated that the number of the guard interval samples in the OFDM symbol varies according to a transmission mode and the length of guard intervals of individual transmission modes. Preferably, the length of guard intervals of the individual transmission modes either $\frac{1}{4}$, $\frac{1}{8}$, $\frac{1}{16}$ or $\frac{1}{32}$ of actual useful data.

Preferably, the frequency offset estimator includes a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a fractional frequency offset compensation value of a current OFDM symbol based on the arc tangent value, an adder adapted to add an estimated fractional frequency offset compensation value of a previous OFDM symbol to the estimated fractional frequency offset compensation value of the current OFDM symbol from the fractional frequency offset detector, a delay unit adapted to delay the estimated fractional frequency offset compensation value from the adder during a single OFDM symbol interval, and a Numerical Controlled Oscillator adapted to generate the fractional frequency offset compensation value based on the estimated fractional frequency offset compensation value from the delay unit and output the fractional frequency offset compensation value to the frequency offset compensator.

Preferably, the adder is further adapted to perform the addition at only a specific position of a last portion of the current OFDM symbol and to use a fractional frequency offset compensation value estimated according to the previous OFDM symbol at the remaining positions other than the specific position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
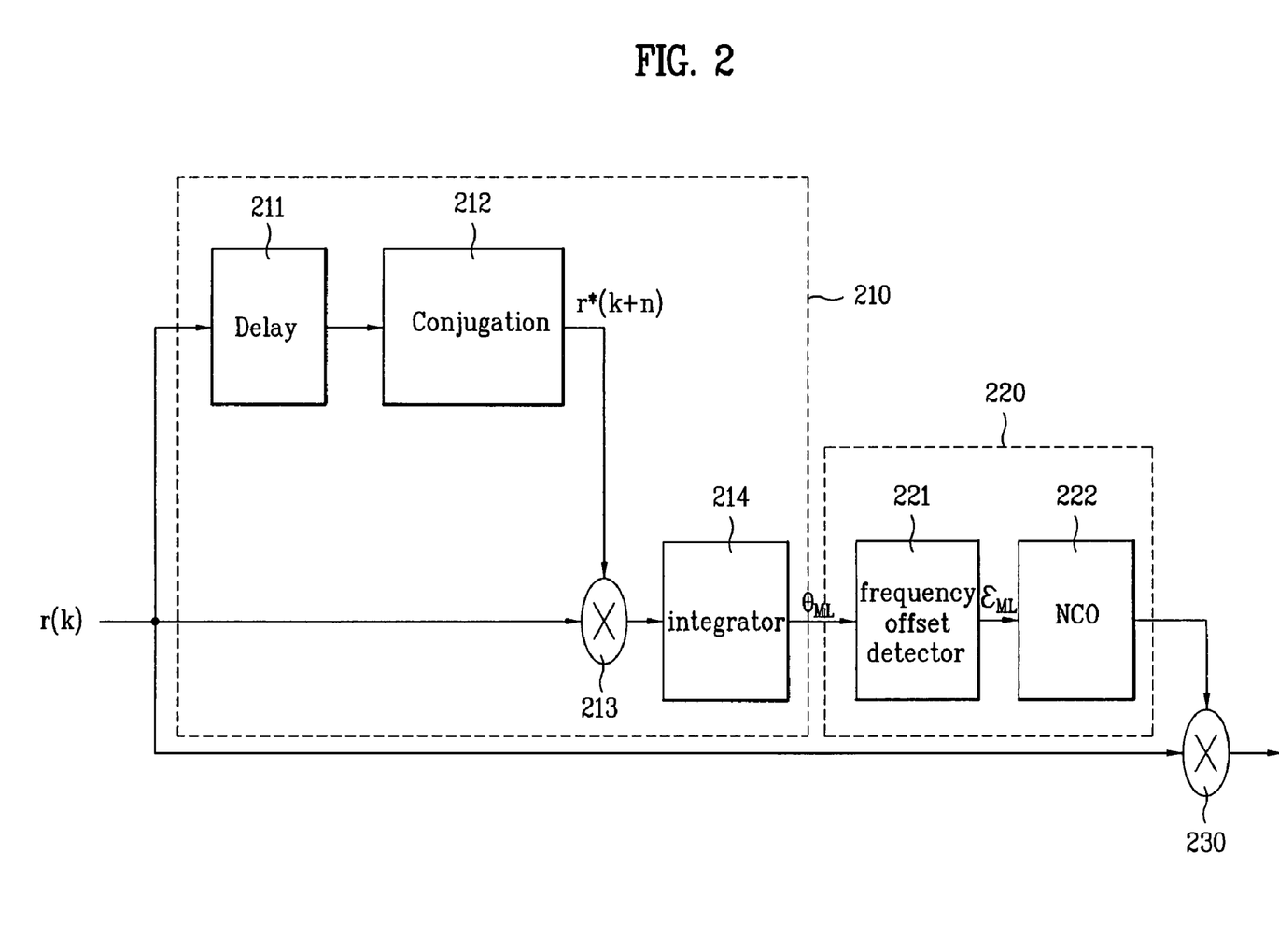
FIG. 2 is a block diagram illustrating a frequency recovery apparatus in accordance with a first preferred embodiment of the present invention.

FIG. 2 is a block diagram illustrating a fractional carrier recovery apparatus for use in a mobile broadcast receiver system such as a DVB-T receiver system in accordance with a first preferred embodiment of the present invention. A method for estimating a fractional frequency offset in a time domain having both more correct performance and more rapid tracking time, and compensating for the estimated fractional frequency offset will hereinafter be described with reference to FIG. 2. However, it should be noted that a method for estimating/compensating for an integral frequency offset is not disclosed in the present invention.

In order to estimate/compensate for the fractional frequency offset in the time domain, position information of the guard interval must be recognized.

A method for detecting the position of the guard interval is initiated on the assumption that a data value of the guard interval is basically identical with a sample data value of the latter half of an OFDM symbol. The above-mentioned assumption of the method for detecting the guard interval position can be established because sample data of the guard interval is indicative of the duplication of the last data of the OFDM symbol.

Therefore, the fractional carrier recovery apparatus shown in FIG. 2 is configured in the form of a feed-forward structure, and includes a guard interval detector 210, a frequency offset estimator 220, and a frequency offset compensator 230.

The guard interval detector 210 may be employed along with the FFT unit 115, because the FFT unit 115 must remove data of the guard interval from among a single OFDM symbol, must perform an FFT process of only useful interval data, and must finally recognize position information of the guard interval.

The guard interval detector 210 includes a delay 211, a conjugation unit 212, a multiplier 213, and an integrator 214. The frequency offset estimator 220 includes a fractional frequency offset detector 221, and a Numerical Controlled Oscillator (NCO) 222. The frequency-offset compensator 230 corresponds to a frequency-offset compensator 114 shown in FIG. 1.

In this case, sample data of a complex component generated from the I/Q divider 113 is applied to the delay 211 and the multiplier 213 of the guard interval detector 210.

The delay 211 delays output sample data of the I/Q divider 113 by the number of useful interval samples varying with a transmission mode, and outputs the delayed output sample data to the conjugation unit 212. The conjugation unit 212 performs conjugation of the output sample data of the delay 211, and outputs the conjugated result to the multiplier 213.

The multiplier 213 multiplies the output sample data of the I/Q divider 113 by the output sample data of the conjugation unit 212, and outputs the multiplied result to the integrator 214. The integrator 214 accumulates the output sample data of the conjugation unit 213 during a predetermined interval corresponding to the number of guard interval samples varying with both a transmission mode and a guard interval length, and outputs the accumulated result to the frequency offset estimator 220.

Typically, a DVB system is classified into a 2k mode and an 8k mode according to the number of carriers contained in a single OFDM symbol. The 2k mode and the 8k mode are each classified into four schemes according to the guard interval length, for example 1/4, 1/8, 1/16 and 1/32. The guard interval length 1/32 is equal to 1/32 of actual useful data.

In the case of the 2k mode, if single reception sample data and the other sample data spaced apart from the single reception sample data by a predetermined distance corresponding to 2038 samples are located in a guard interval in which useful interval data is copied and the useful interval for coping data in the guard interval, respectively, the single reception sample data is the same as the other sample data spaced apart from the single reception sample data. Otherwise, if the single reception sample data and the other sample data spaced apart from the single reception sample data by a predetermined distance corresponding to 2038 samples are not located in the guard interval in which useful interval data is copied and the useful interval for coping data in the guard interval, respectively, the single reception sample data is different from the other sample data spaced apart from the single reception sample data.

For example, in the case where the number of useful data samples contained in a single OFDM symbol in the case of the 2k mode is equal to 2048, and the length of the guard interval is equal to 1/32, the number of guard interval samples is equal to 64. In the case where the number of useful data samples contained in a single OFDM symbol in the case of the 8k mode is equal to 8192, and the length of the guard interval is equal to 1/32, the number of guard interval samples is equal to 256.

Therefore, the delay 211 delays input sample data by a predetermined time corresponding to 2048 samples in the case of the 2k mode. In this way, the delay 211 delays input sample data by a predetermined time corresponding to 8192 samples in the case of the 8k mode.

If the delay 211 outputs sample data delayed by 2048 samples, an output signal of the conjugation unit 212 is equal to a predetermined signal, wherein one of two signals spaced apart from each other by 2048 samples is conjugated and the conjugated signal and the other signal are multiplied with each other.

The integrator 214 accumulates the output sample data of the multiplier 213 during a predetermined interval corresponding to 64 samples on the assumption that the length of the guard interval is 1/32. For example, according to the above-mentioned assumption, a conjugate product of L sample data units spaced apart from each other by a predetermined distance corresponding to N samples (i.e., 2048 samples) is accumulated.

If an absolute value of the output result of the integrator 214 reaches a maximum value within the length of a single OFDM symbol at a predetermined location, the predetermined location serves as a start point of a useful data interval of the corresponding OFDM symbol. Therefore, an FFT window is generated on the basis of position data indicative of the above-mentioned maximum value, and the FFT unit 115 performs an FFT process on only I and Q signals contained in the FFT window range.

In the meantime, the frequency offset estimator 220 correctly and quickly estimates a fractional frequency offset using both an I component and a Q component of a predetermined value corresponding to a predetermined position at which the guard interval detector 210 has a maximum value.

In other words, the Q-component value of the above-mentioned maximum value position is divided by the I-component value thereof, and an arc tangent value of the divided result is acquired, such that a fractional frequency offset is estimated using the arc tangent value.

The following equations 1, 2, and 3 are provided to numerically represent a guard interval detection process and a fractional frequency offset estimation process.

The output signal of the guard interval detector 210, i.e., the output signal of the integrator 214 can be represented by the following equation 1:

$$\gamma(\theta) = \sum_{k=\theta}^{\theta+L-1} \gamma(k)\gamma^*(k+N) \quad \text{[Equation 1]}$$

Referring to the above Equation 1, r(k) is k-th sample data sequentially applied to the delay 211, the multiplier 213, and the frequency offset compensator 230, and r*(k+N) is output sample data of the conjugation unit 212. In this case, N is the number of useful samples contained in the OFDM symbol according to a transmission mode. For example, in the case of the 2k mode, N is set to 2048. In the case of the 8k mode, N is set to 8192. In the above Equation 1, θ is denoted by θ=[0, N+L−1], is indicative of the length of a single OFDM symbol, and L is indicative of the length of the guard interval.

The following equation 2 is provided to search for a frequency offset estimation start point of the frequency offset estimator 220, i.e., an FFT-window start point serving as the OFDM symbol start point.

$$\theta_{ML} = \underset{\theta}{\arg\max} \, |\gamma(\theta)| \quad \text{[Equation 2]}$$

Referring to the above Equation 2, $\theta_{ML}$ is indicative of a predetermined position at which an absolute value of the result value of the integrator 214 reaches a maximum value, and is indicative of a start point of a corresponding OFDM symbol. Since data of the guard interval is the duplication of the last data of the OFDM symbol, $\theta_{ML}$ has the highest probability for allowing the sum of the guard interval data and the absolute value to reach the maximum value.

A fractional frequency offset $\epsilon_{ML}$ detected from the fractional frequency offset detector 221 of the frequency offset estimator 220 can be represented by the following equation 3:

$$\varepsilon_{ML} = -\frac{1}{2\pi} L\gamma(\theta_{ML}) \quad \text{[Equation 3]}$$

In more detail, the fractional frequency offset detector 221 divides a Q-component value of the maximum-value position $\theta_{ML}$ by an I-component value thereof, an arc tangent value of the divided result is acquired, such that a fractional frequency offset $\epsilon_{ML}$ can be estimated.

In this way, the fractional frequency offset according to the present invention can be estimated using phase variance between a guard interval and the latter half of a useful data interval in a time domain.

In this case, the value estimated by the fractional frequency offset detector 221 is indicative of a frequency offset instead of a phase value, such that it is directly applied to the NCO 222 without passing through a Loop Filter (LF).

Due to the above-mentioned characteristics, the present invention has a relatively short acquisition time, and has acquisition characteristics superior to those of a conventional structure for calculating a frequency offset by accumulating phase values in most intervals other than an averaging interval.

Figure 3A:
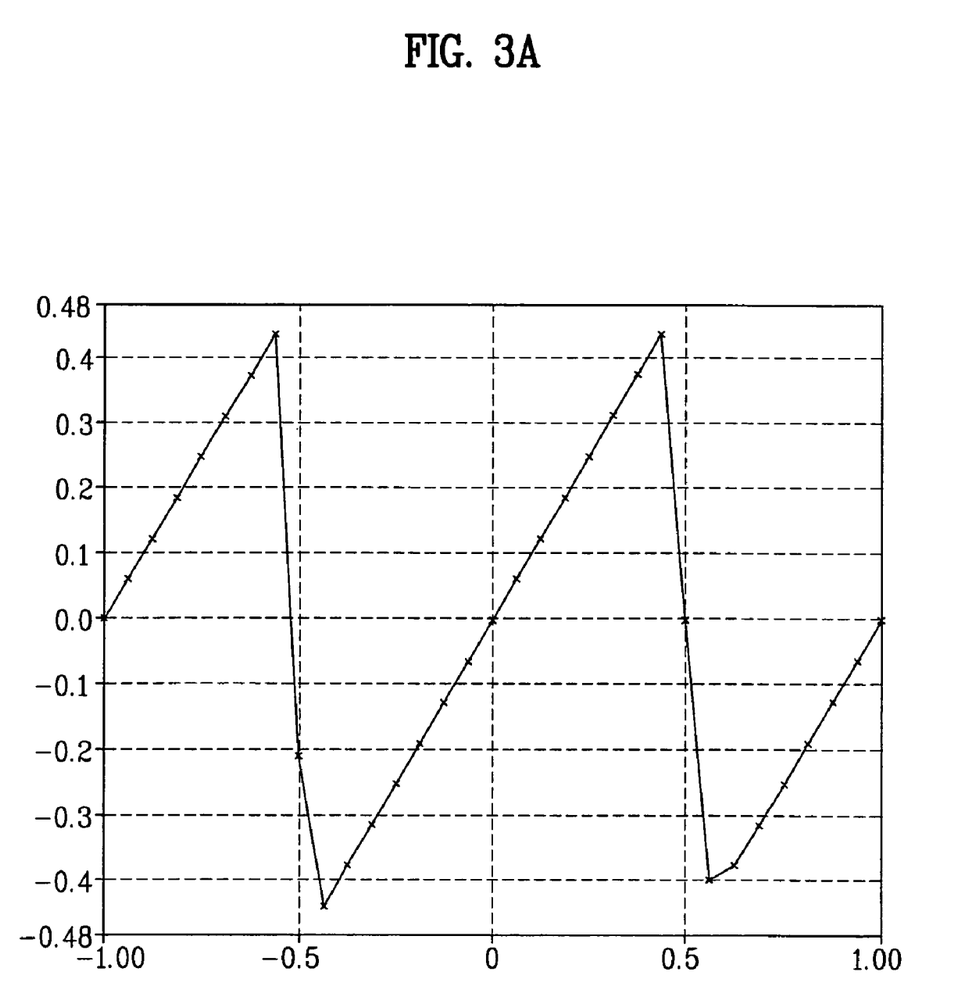
FIG. 3a is a graph illustrating mean characteristics of a fractional frequency offset detector shown in FIG. 2.
Figure 3B:
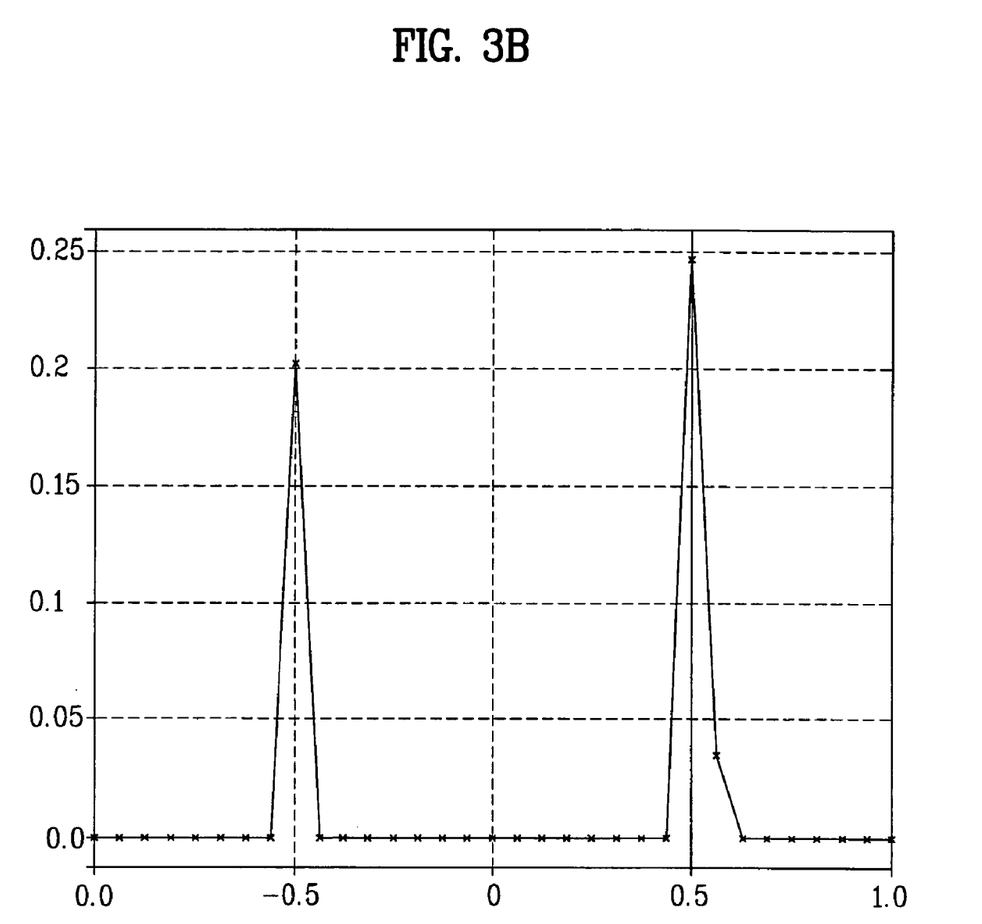
FIG. 3b is a graph illustrating variance characteristics of a fractional frequency offset detector shown in FIG. 2.

FIG. 3a is a graph illustrating mean characteristics of the fractional FED shown in FIG. 2. FIG. 3b is a graph illustrating variance characteristics of the fractional FED shown in FIG. 2. The output signal of the fractional frequency offset detector 221 is proportional to a frequency offset such that it maintains linearity in association with the frequency offset. Therefore, the output signal of the fractional frequency offset detector 221 has rapid acquisition characteristics as shown in FIG. 3.

If a fractional frequency offset is estimated using the fractional carrier recovery device shown in FIG. 2, a frequency offset corresponding to 0.5 times a sub-carrier spacing may fluctuate between 0.5 and −0.5 values due to arc tangent function characteristics. The variance characteristics shown in FIG. 3b have peak values at 0.5 and −0.5 values. The above-mentioned peak value arrangement in FIG. 3b also indicates that the frequency offset fluctuates between 0.5 and −0.5 values.

Figure 4:
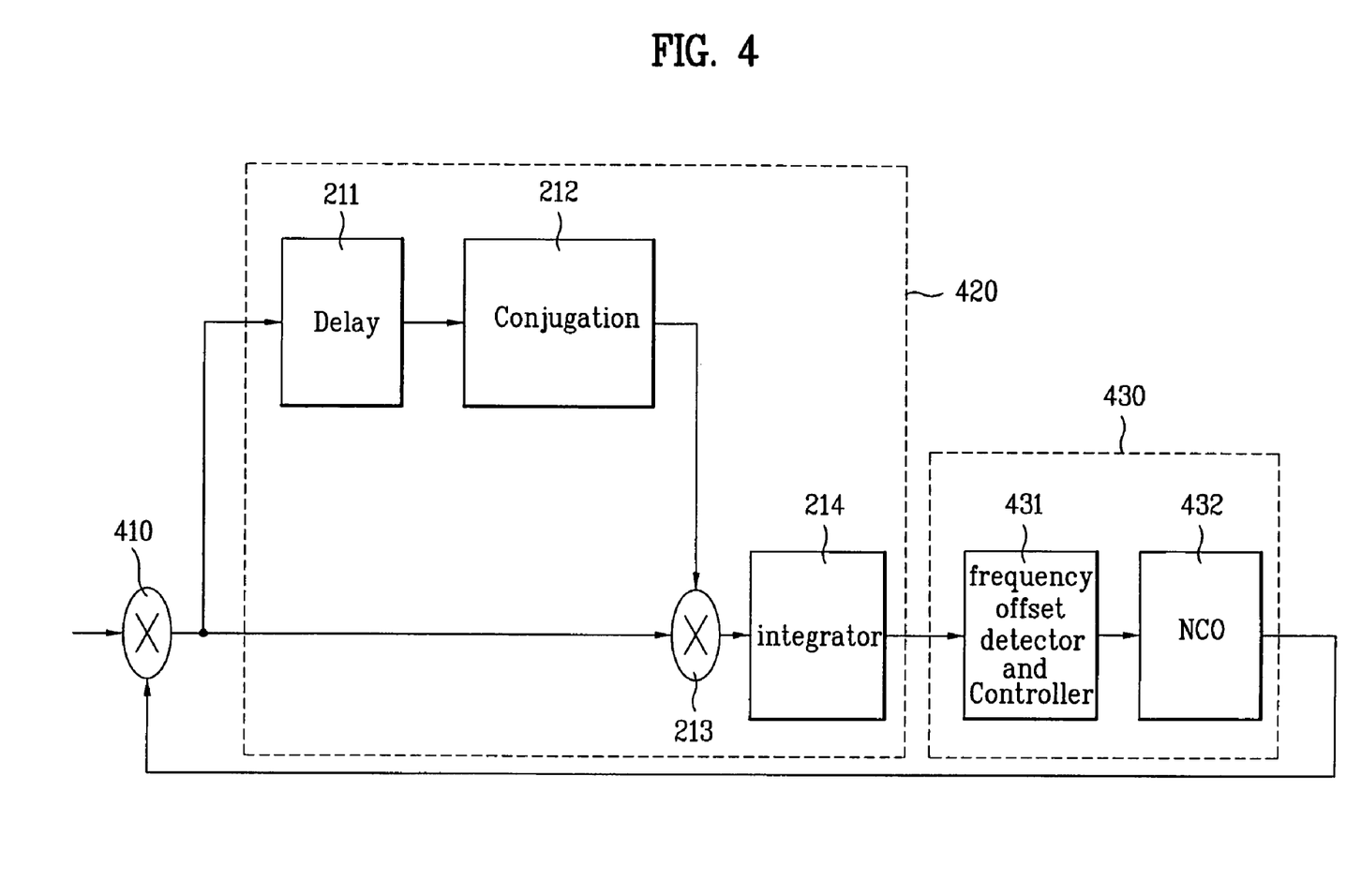
FIG. 4 is a block diagram illustrating a frequency recovery apparatus in accordance with a second preferred embodiment of the present invention.

FIG. 4 is a block diagram illustrating a fractional carrier recovery apparatus using a feedback structure in accordance with a second preferred embodiment of the present invention, and is provided to solve problems generated when the frequency offset is set to 0.5. Referring to FIG. 4, a frequency offset compensator 410 is located at the front of a guard interval detector 420, such that sample data, a frequency offset of which is compensated by the frequency offset compensator 410, is applied to the guard interval detector 420.

The internal configuration of the guard interval detector 420 is equal to that of FIG. 2, but signals applied to the delay 211 and the multiplier 213 of the guard interval detector 420 in FIG. 4 are different from those of FIG. 2. According to the feed-forward structure shown in FIG. 2, output sample data of the I/Q divider 113 is applied to the delay 211 and the multiplier 214 of the guard interval detector 210. According to the feedback structure shown in FIG. 4, output sample data of the frequency-offset compensator 410 is applied to the delay 211 and the multiplier 213 of the guard interval detector 420.

Complex sample data generated from the I/Q divider 113 is applied to the frequency-offset compensator 410. The frequency offset compensator 410 multiplies output sample data of the I/Q divider 113 by the output sample data of the frequency offset estimator 430 to compensate for a frequency offset of baseband sample data, and outputs the baseband sample data having the compensated frequency offset to the FFT unit 115.

The output sample data of the frequency-offset compensator 410 is applied to the delay 211 and the multiplier 214 of the guard interval detector 420.

The delay 211 delays the output sample data of the frequency offset compensator 410 by the number of useful samples contained in an OFDM symbol corresponding to a transmission mode, and outputs the delayed sample data to the conjugation unit 212. The conjugation unit 212 performs conjugation of the output sample data of the delay 211, and outputs the conjugated result to the multiplier 213.

The multiplier 213 multiplies the output sample data of the frequency offset compensator 410 by the output sample data of the conjugation unit 212, and outputs the multiplied result to the integrator 214. The integrator 214 accumulates the output sample data of the multiplier 213 during a predetermined interval corresponding to the number (L) of guard interval samples varying with both the transmission mode and the guard interval length, and outputs the accumulated result to the frequency offset estimator 430. A detailed description of the guard interval detector 420 will hereinafter be described with reference to FIG. 2.

In order to configure the above-mentioned fractional carrier recovery device in the form of a feedback structure, a fractional frequency offset detector and controller 431 must be corrected, and its detailed description will hereinafter be described with reference to FIG. 5.

Figure 5:
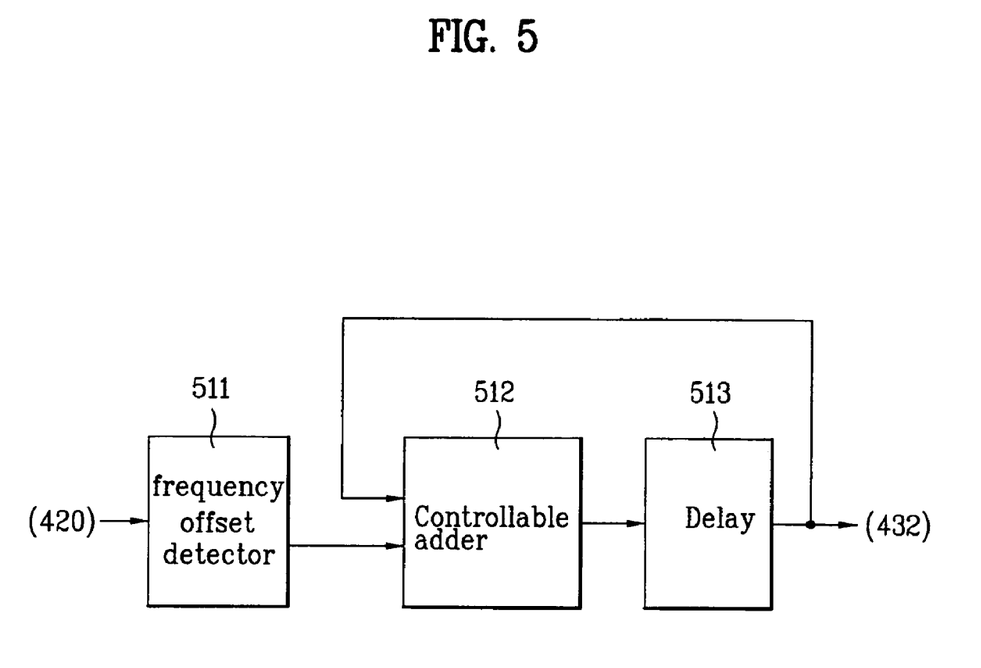
FIG. 5 is a detailed block diagram of the fractional frequency offset detector and controller illustrated in FIG. 4.

FIG. 5 is a detailed block diagram of the fractional frequency offset detector and controller 431 shown in FIG. 4. The fractional frequency offset detector and controller 431 includes a fractional frequency offset detector 511, an adder 512, and a delay 513 sequentially connected.

In more detail, the fractional frequency offset detector 511 divides a Q-component value of the output value of the guard interval detector 420 by an I-component value thereof, and acquires an arc tangent value of the divided result, such that it estimates a fractional frequency offset of a current OFDM symbol using the arc tangent value. The output signal of the fractional frequency offset detector 511 is transmitted to the adder 512.

The adder 512 adds a frequency offset estimation value of a previous OFDM symbol generated from the delay 513 to a frequency offset estimation value of the current OFDM symbol generated from the fractional frequency offset detector 511. In this case, the adder 512 performs the addition at only a specific position of the last position of the OFDM symbol, instead of adding two frequency-offset estimation values at all times. The adder 512 outputs a frequency offset value estimated from the previous OFDM symbol at the remaining positions other than the above-mentioned specific position. The delay 513 delays a frequency offset value of the current OFDM symbol by a single OFDM symbol, outputs the delayed result to the NCO 432, and the output signal of the delay 513 is fed back to the adder 512.

The present invention is applicable to the above-mentioned DVB-H receiver and a DVB-T receiver. It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

The present invention has been disclosed in the above-mentioned preferred embodiments, such that those skilled in the art may easily modify the above-mentioned preferred embodiment according to technical scope and difficulty of the present invention. Therefore, it should be understood that other preferred embodiments and modification based on technical contents of the present invention belong to the scope of the appended claims of the present invention.

As apparent from the above description, a fractional carrier recovery apparatus and a mobile broadcast receiver system using the same according to the present invention estimate a fractional frequency offset value using I and Q components of a correlation value of a guard interval, and compensate for the estimated fractional frequency offset value, resulting in the implementation of correct and rapid acquisition characteristics.

The feedback-structured fractional carrier recovery apparatus estimates a fractional frequency offset, and compensates for the estimated fractional frequency offset, such that it solves the problem of ambiguity which may occur in a specific position corresponding to 0.5 times a sub-carrier spacing, and the fractional frequency offset can be stably estimated or compensated for.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A frequency recovery apparatus for use in receiving an Orthogonal Frequency Division Multiplexing (OFDM) symbol comprising a useful data interval and a guard interval, the apparatus comprising:
   a guard interval detector adapted to detect guard interval information in baseband complex digital sample data, the baseband complex digital sample data obtained by demodulating and compensating the OFDM symbol; and
   a frequency offset estimator adapted to determine a start position of the useful data interval of the OFDM symbol using the detected guard interval information, divide a Quadrature-component value of the start position by an In phase-component value of the start position, calculate an arc tangent value based on the divided result, and generate a fractional frequency offset compensation value based on the arc tangent value.

2. The apparatus of claim 1, further comprising a frequency offset compensator adapted to multiply complex digital sample data obtained by demodulating the OFDM symbol by the fractional frequency offset compensation value from the frequency offset estimator and generate the baseband complex sample data having a compensated fractional frequency offset.

3. The apparatus of claim 1, wherein the guard interval detector comprises:
   a delay unit adapted to delay the baseband complex digital sample data by a number of samples corresponding to a number of samples in the useful data interval of the OFDM symbol;
   a conjugation unit adapted to conjugate the delayed baseband complex digital sample data;
   a multiplier unit adapted to multiply the baseband complex digital sample data by the delayed conjugated baseband complex digital sample data; and
   an integrator unit adapted to accumulate an output value of the multiplier unit during a predetermined time corresponding to a number of guard interval samples in the OFDM symbol and output the accumulated result.

4. The apparatus of claim 3, wherein the number of samples in the useful data interval of the OFDM symbol varies according to a transmission mode.

5. The apparatus of claim 4, wherein the transmission mode is one of a 2K mode and an 8K mode according to the number of carriers contained in a single OFDM symbol and the 2K mode has fewer carriers than the 8K mode.

6. The apparatus according of claim 3, wherein the number of the guard interval samples in the OFDM symbol varies according to a selected transmission mode and a particular scheme of guard interval length for the selected transmission mode.

7. The apparatus of claim 6, wherein the length of guard intervals of the individual transmission modes is at least one of ¼, ⅛, ¹⁄₁₆ and ¹⁄₃₂ of actual useful data.

8. The apparatus of claim 3, wherein the frequency offset estimator comprises:
   a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a compensation value based on the arc tangent value; and
   a Numerical Controlled Oscillator adapted to generate the fractional frequency offset compensation value based on the compensation value from the fractional frequency offset detector.

9. A frequency recovery apparatus for use in receiving an Orthogonal Frequency Division Multiplexing (OFDM) symbol comprising a useful data interval and a guard interval, the apparatus comprising:
   a frequency offset compensator adapted to generate baseband complex digital sample data by multiplying complex digital sample data by a fractional frequency offset compensation value, the complex digital sample data obtained by demodulating the OFDM symbol;
   a guard interval detector adapted to detect guard interval information in the baseband complex digital sample data; and
   a frequency offset estimator adapted to determine a start position of the useful data interval of the OFDM symbol using the detected guard interval information, divide a Quadrature-component value of the start position by an In phase-component value of the start position, calculate an arc tangent value based on the divided result, generate the fractional frequency offset compensation value based on the arc tangent value, and output the fractional frequency offset compensation value to the frequency offset compensator.

10. The apparatus of claim 9, wherein the guard interval detector comprises:
   a delay unit adapted to delay the baseband complex digital sample data by a number of samples corresponding to a number of samples in the useful data interval of the OFDM symbol;
   a conjugation unit adapted to conjugate the delayed baseband complex digital sample data;
   a multiplier unit adapted to multiply the baseband complex digital sample data by the delayed conjugated baseband complex digital sample data; and an integrator unit adapted to accumulate an output value of the multiplier unit during a predetermined time corresponding to a number of guard interval samples in the OFDM symbol and output the accumulated result.

11. The apparatus of claim 10, wherein the number of samples in the useful data interval of the OFDM symbol varies according to a transmission mode.

12. The apparatus of claim 10, wherein the transmission mode is one of a 2K mode and an 8K mode according to the number of carriers contained in a single OFDM symbol and the 2K mode has fewer carriers than the 8K mode.

13. The apparatus according of claim 10, wherein the number of the guard interval samples in the OFDM symbol varies according to a selected transmission mode and a particular scheme of guard interval length for the selected transmission mode.

14. The apparatus of claim 13, wherein the length of guard intervals of the individual transmission modes is at least one of $1/4$, $1/8$, $1/16$ and $1/32$ of actual useful data.

15. The apparatus of claim 10, wherein the frequency offset estimator comprises:
a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a compensation value of a current OFDM symbol based on the arc tangent value;
an adder adapted to add an estimated compensation value of a previous OFDM symbol to the estimated compensation value of the current OFDM symbol from the fractional frequency offset detector;
a delay unit adapted to delay the added estimated compensation value from the adder during a single OFDM symbol interval; and
a Numerical Controlled Oscillator adapted to generate the fractional frequency offset compensation value based on the added estimated compensation value from the delay unit and output the fractional frequency offset compensation value to the frequency offset compensator.

16. The apparatus of claim 15, wherein the adder is further adapted to perform addition at only a specific position of a last portion of the current OFDM symbol and to use the estimated compensation value of the previous OFDM symbol at the remaining positions other than the specific position.

17. A mobile broadcast receiver, comprising:
a tuner adapted to receive and tune an Orthogonal Frequency Division Multiplexing (OFDM) symbol comprising a useful data interval and a guard interval;
a demodulator adapted to digitize the tuned OFDM symbol from the tuner and generate complex digital sample data;
a guard interval detector adapted to detect guard interval information in baseband complex digital sample data, the baseband complex digital sample data obtained by compensating the complex digital sample data;
a frequency offset estimator adapted to determine a start position of the useful data interval of the OFDM symbol using the detected guard interval information, divide a Quadrature-component value of the start position by an In phase-component value of the start position, calculate an arc tangent value based on the divided result, and generate a fractional frequency offset compensation value based on the arc tangent value;
a frequency offset compensator adapted to multiply the complex digital sample by the fractional frequency offset compensation value from the frequency offset estimator and generate the baseband complex sample data having a compensated fractional frequency offset; and
a Fast Fourier Transform (FFT) unit adapted to generate an FFT window and perform an FFT process on only baseband complex sample data contained in the FFT window from among the baseband complex sample data generated by the frequency offset compensator.

18. The apparatus of claim 17, wherein the guard interval detector comprises:
a delay unit adapted to delay the baseband complex digital sample data by a number of samples corresponding to a number of samples in the useful data interval of the OFDM symbol;
a conjugation unit adapted to conjugate the delayed baseband complex digital sample data;
a multiplier unit adapted to multiply the baseband complex digital sample data by the delayed conjugated baseband complex digital sample data; and
an integrator unit adapted to accumulate an output value of the multiplier unit during a predetermined time corresponding to a number of guard interval samples in the OFDM symbol and output the accumulated result.

19. The apparatus of claim 18, wherein the number of samples in the useful data interval of the OFDM symbol varies according to a transmission mode.

20. The apparatus of claim 19, wherein the transmission mode is one of a 2K mode and an 8K mode according to the number of carriers contained in a single OFDM symbol and the 2K mode has fewer carriers than the 8K mode.

21. The apparatus according of claim 18, wherein the number of the guard interval samples in the OFDM symbol varies according to a selected transmission mode and a particular scheme of guard interval length for the selected transmission mode.

22. The apparatus of claim 21, wherein the length of guard intervals of the individual transmission modes is at least one of $1/4$, $1/8$, $1/16$ and $1/32$ of actual useful data.

23. The apparatus of claim 18, wherein the frequency offset estimator comprises:
a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a compensation value based on the arc tangent value; and
a Numerical Controlled Oscillator adapted to generate the fractional frequency offset compensation value based on the compensation value from the fractional frequency offset detector.

24. A mobile broadcast receiver, comprising:
a tuner adapted to receive and tune an Orthogonal Frequency Division Multiplexing (OFDM) symbol comprising a useful data interval and a guard interval;
a demodulator adapted to digitize the tuned OFDM symbol from the tuner and generate complex digital sample data;
a frequency offset compensator adapted to generate baseband complex digital sample data by multiplying the complex digital sample data from the demodulator by a fractional frequency offset compensation value;

a guard interval detector adapted to detect guard interval information in the baseband complex digital sample data;

a frequency offset estimator adapted to determine a start position of the useful data interval of the OFDM symbol using the detected guard interval information, divide a Quadrature-component value of the start position by an In phase-component value of the start position, calculate an arc tangent value based on the divided result, generate the fractional frequency offset compensation value based on the arc tangent value, and output the fractional frequency offset compensation value to the frequency offset compensator; and a Fast Fourier Transform (FFT) unit adapted to generate an FFT window and perform an FFT process on only baseband complex sample data contained in the FFT window from among the baseband complex sample data generated by the frequency offset compensator.

25. The apparatus of claim 24, wherein the guard interval detector comprises:

a delay unit adapted to delay the baseband complex digital sample data by a number of samples corresponding to a number of samples in the useful data interval of the OFDM symbol;

a conjugation unit adapted to conjugate the delayed baseband complex digital sample data;

a multiplier unit adapted to multiply the baseband complex digital sample data by the delayed baseband complex digital sample data; and an integrator unit adapted to accumulate an output value of the multiplier unit during a predetermined time corresponding to a number of guard interval samples in the OFDM symbol and output the accumulated result.

26. The apparatus of claim 25, wherein the number of samples in the useful data interval of the OFDM symbol varies according to a transmission mode.

27. The apparatus of claim 26, wherein the transmission mode is one of a 2K mode and an 8K mode according to the number of carriers contained in a single OFDM symbol and the 2K mode has fewer carriers than the 8K mode.

28. The apparatus according of claim 25, wherein the number of the guard interval samples in the OFDM symbol varies according to a selected transmission mode and a particular scheme of guard interval length for the selected transmission mode.

29. The apparatus of claim 28, wherein the length of guard intervals of the individual transmission modes is at least one of $1/4$, $1/8$, $1/16$ and $1/32$ of actual useful data.

30. The apparatus of claim 25, wherein the frequency offset estimator comprises:

a fractional frequency offset detector adapted to calculate accumulated data corresponding to a position of a maximum absolute value from among a plurality of absolute values of output values accumulated by the guard interval detector, divide a Quadrature-component value of the accumulated data by an In phase-component value of the accumulated data, calculate an arc tangent value based on the divided result, and estimate a compensation value of a current OFDM symbol based on the arc tangent value;

an adder adapted to add an estimated compensation value of a previous OFDM symbol to the estimated compensation value of the current OFDM symbol from the fractional frequency offset detector;

a delay unit adapted to delay the added estimated compensation value from the adder during a single OFDM symbol interval; and a Numerical Controlled Oscillator adapted to generate the fractional frequency offset compensation value based on the added estimated compensation value from the delay unit and output the fractional frequency offset compensation value to the frequency offset compensator.

31. The apparatus of claim 30, wherein the adder is further adapted to perform addition at only a specific position of a last portion of the current OFDM symbol and to use the estimated compensation value of the previous OFDM symbol at the remaining positions other than the specific position.

* * * * *